United States Patent [19]

Wiegardt et al.

[11] Patent Number: 4,508,176

[45] Date of Patent: Apr. 2, 1985

[54] VEHICLE WITH CONTROL SYSTEM HAVING OPERATOR-ACTUABLE SWITCH FOR STORING PARAMETER SIGNAL VALUE TO CONTROL VEHICLE-CONNECTED IMPLEMENT RAISING AND LOWERING STRUCTURE

[75] Inventors: Gordon K. Wiegardt; Thomas W. Hanks, both of Cedar Falls; Kenneth E. Murphy, Reinbeck, all of Iowa

[73] Assignee: Deere & Company, Moline, Ill.

[21] Appl. No.: 443,415

[22] Filed: Nov. 22, 1982

[51] Int. Cl.³ .................................... A01B 63/112
[52] U.S. Cl. ............................. 172/7; 200/61.54; 364/160; 364/180
[58] Field of Search ............... 172/2, 3, 4, 7, 9, 10, 172/430; 340/519; 368/188; 56/10.2; 364/148, 160, 180, 424; 200/6 A, 61.54, 61.36

[56] References Cited

U.S. PATENT DOCUMENTS

| | | | |
|---|---|---|---|
| 2,940,530 | 6/1960 | Du Shane | 172/7 |
| 3,516,498 | 6/1970 | Schowalter | 172/9 |
| 3,860,074 | 1/1975 | Maistrelli | 172/7 |
| 3,988,730 | 10/1976 | Valker | 340/519 X |
| 3,994,348 | 11/1976 | Schowalter | 172/9 |
| 4,013,875 | 3/1977 | McGlynn | 172/2 X |
| 4,030,283 | 6/1977 | Sauthier et al. | 368/188 |
| 4,064,945 | 12/1977 | Haney | 172/4 |
| 4,221,266 | 9/1980 | Fardal | 172/4 |
| 4,300,638 | 11/1981 | Katayama et al. | 172/10 |
| 4,343,365 | 8/1982 | Rajagopal et al. | 172/4 |
| 4,458,471 | 7/1984 | Herwig | 56/10.2 |

Primary Examiner—Richard T. Stouffer

[57] ABSTRACT

A hitch control system includes a position control lever coupled to a transducer which produces desired position signals, a draft force sensor and a hitch position sensor. A push-button switch is mounted in the control lever housing. A signal processor stores selected values of the sensed draft force in response to actuation of the push-button switch. The signal processor generates position error signals from the desired position and sensed position signals, and generates a load error signal from the sensed draft force and the stored selected draft force values. The hitch is controlled as a function of these errors.

14 Claims, 6 Drawing Figures

4,508,176

VEHICLE WITH CONTROL SYSTEM HAVING OPERATOR-ACTUABLE SWITCH FOR STORING PARAMETER SIGNAL VALUE TO CONTROL VEHICLE-CONNECTED IMPLEMENT RAISING AND LOWERING STRUCTURE

BACKGROUND OF THE INVENTION

This invention relates to a control system for controlling the working depth of a tractor-coupled implement as a function of various sensed and operator-controlled parameters.

A hitch control system for controlling implement working depth as a function of various sensed vehicle and implement operating parameters and operator-generated command signals is described in U.S. application, Ser. No. 360,748, filed Mar. 22, 1982. The control system described therein has a control lever and transducer for generating a position command signal, as well as a rotatable control knob and potentiometer for generating draft or load command signals representing desired hitch positions and desired draft forces. Other hitch control systems, such as described in U.S. Pat. Nos. 4,300,638 and 3,860,074, require separate operator-controlled position and draft force control levers or knobs for the production of position and draft force error signals. It would be desirable, in a hitch control system which is responsive to a position error and load error, to reduce the complexity of these operator controls by eliminating the load control knob or lever.

SUMMARY OF THE INVENTION

An object of the present invention is to provide simple operating controls for a hitch system which controls implement depth as a function of draft and hitch position.

This and other objects are achieved by the present invention which includes an operator-controlled position command lever and transducer for generating a position command signal.

A push-button coupled to a switch is mounted in the handle of the position command lever. A signal processor coupled to the lever transducer and to the push-button switch stores a draft force set point value when the push-button is depressed and then released. Or, if the push-button is held depressed, the draft force set point is increased at a prescribed rate. For hitch control systems having additional inputs, such as wheel slip and/or engine speed, set point values relating to wheel slip and engine droop could be stored in a similar manner. The signal processor generates error signals as a function of the set point values and various sensed operating parameters. The signal processor converts the error signals to a control signal which is applied to an electrohydraulic actuator which positions the hitch and implement accordingly.

DETAILED DESCRIPTION

Figure 1:
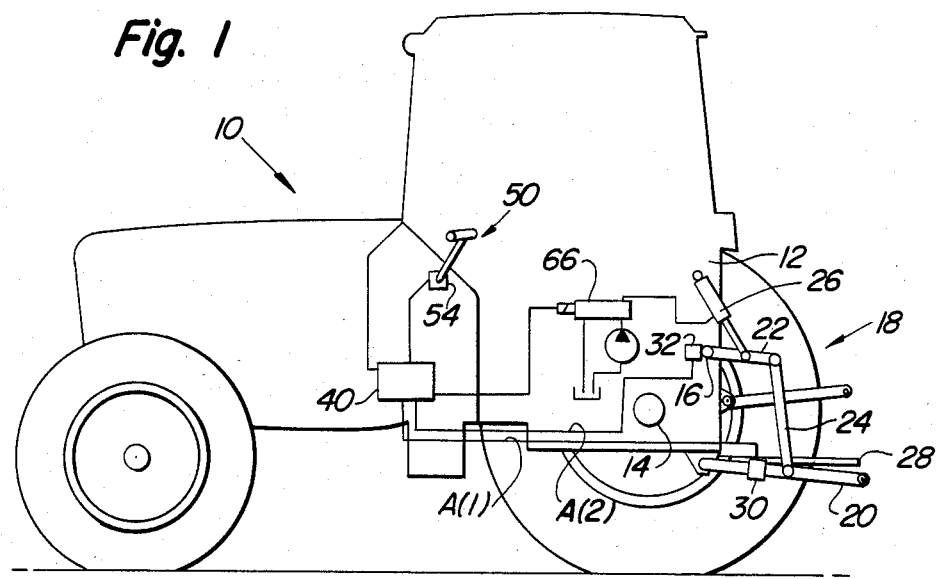
FIG. 1 is a simplified schematic of an agricultural tractor equipped with the present invention.

A tractor 10 includes a rear housing 12 which supports a rear axle 14 and a rockshaft 16. An implement hitch 18, such as a conventional 3-point hitch, includes draft links 20 which are connected to lift arms 22 via lift links 24. The lift arms 22 are connected to the rockshaft 16 to insure simultaneous and equal movement and are raised and lowered via a pair of parallel connected hydraulic lift or rockshaft cylinders 26. A drawbar 28 extends rearwardly from the housing 12. The tractor 10 and the hitch 18 are merely exemplary and those skilled in the art will understand that the invention can be applied to tractors and hitches of other configurations. For example, this invention can be used on an articulated four-wheel drive tractor or on a row-crop tractor with front-wheel drive.

An integral-type, ground-engaging implement (not shown), such as a moldboard plow or a chisel plow, may be attached in a conventional manner to the draft links 20. Alternatively, a towed implement (not shown) may be coupled to the drawbar 28. Draft sensors 30 may be interposed in the hitch 18, for example, in the draft links 20, to sense the draft force transmitted to the draft links 20 from the integral implement. If a plurality of draft sensors are interposed in the hitch 18, then a single draft representative signal may be obtained by combining together the separate signals from the plurality of sensors 30. In the case of a towed implement, the draft force may be sensed with a draft sensor interposed in the drawbar 28, or with a T-bar coupled to the draft links. In either case, any suitable known draft sensor would suffice and the signal $A(1)$ therefrom is communicated to a central processing unit 40. A position transducer 32, such as a conventional rotary potentiometer, generates a sensed position signal, $A(2)$, which represents the actual sensed position of the rockshaft 16. A position feedback signal could also be obtained from the lift cylinder 26 or from a remote lift cylinder if that cylinder includes a position transducer, such as described in U.S. Pat. No. 3,726,191, for example.

Figure 2:
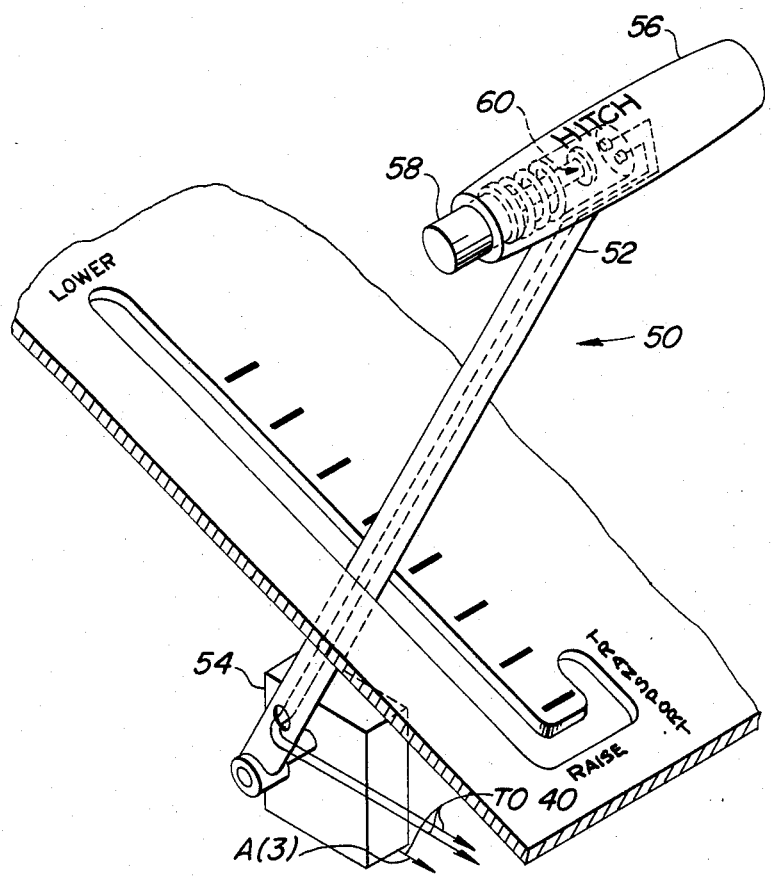
FIG. 2 is a detailed view of a portion of FIG. 1.

The present invention includes an apparatus or lever indicated by reference numeral 50 in FIG. 1 and shown in an enlarged detail in FIG. 2. Lever 50 comprises a shaft 52 pivotally attached to a transducer 54, such as a potentiometer, which generates an analog signal $A(3)$ which represent the position of shaft 52. A cross-mounted handle 56 is mounted on the end of shaft 52 for grasping by the vehicle operator. A push-button 58 projects from an end of the handle 56. A contact switch 60 is coupled to the push-button 58 so that the switch 60 will be closed when the button 58 is depressed. A spring biases the button 58 or the switch 60 so that it remains normally open.

Ajustable mechanical stops or limits (not shown) could be provided to mechanically limit the position of control lever 50, and thus limit the signal from potentiometer 54.

The communication of hydraulic fluid to and from the cylinders 26 or to and from a remote cylinder (not shown) on a towed or semi-integral implement is controlled by a conventional solenoid-operated electrohydraulic flow control valve 66 which receives electrical control signals generated by a control unit or central processing unit 40, which may include a digital microprocessor, analog-to-digital converters, multiplexers and/or other equivalent conventional hardware components. The flow control valve 66 may be comprised of a commerically available servo-valve with a torque motor-operated pilot stage and an integral second stage. The output hydraulic flow rate is substantially proportional to the magnitude of the electrical current applied to the torque motor of the valve 66.

Figure 4:
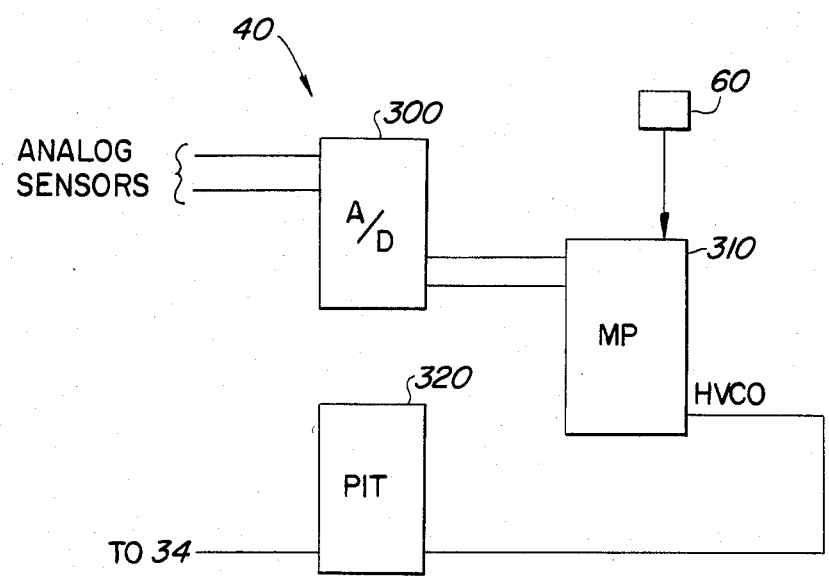
FIG. 4 is a simplified schematic of a central processing unit connected for use in the present invention.

As shown in FIG. 4, in the preferred case where the central processing unit 40 includes a digital microprocessor, a suitable central processing unit 40 could be comprised of a conventional analog-to-digital convertor with multiplexer 300, a microprocessor 310 and a programmable interval time (PIT) 320. The A/D converter 300 converts the analog signals from transducers 30, 32, 54, 62, and 64 to digital representations for communication to the microprocessor 310. The microprocessor 310, such as an Intel 8751 or T.I. 9940, generates digital HVCO values, according to the algorithm described in detail hereinafter. Finally, the PIT 320 converts the digital HVCO values to pulse-width modulated valve driving signals for driving the conventional torque motor controlled valve 66 to retract and extend the cylinders 26 and raise and lower the implement (not shown) attached thereto. The control unit 40 could be implemented with other hardware configurations as well. For example, the microprocessor 310 could include internal memory, or memory could be external to the microprocessor 310. Appropriate scaling factors are applied to the signals from all the sensors so that their minimum and maximum values are represented by digital counts of 0 to 255, respectively. In this manner, the system has the capability of responding to changes in the input variables as small as approximately 0.4% and the variables can be stored in 8-bit registers.

Conventional EMI filters could be used in various portions of the lines connected to the control unit 40 to filter out electromagnetic interference.

Figure 3A:
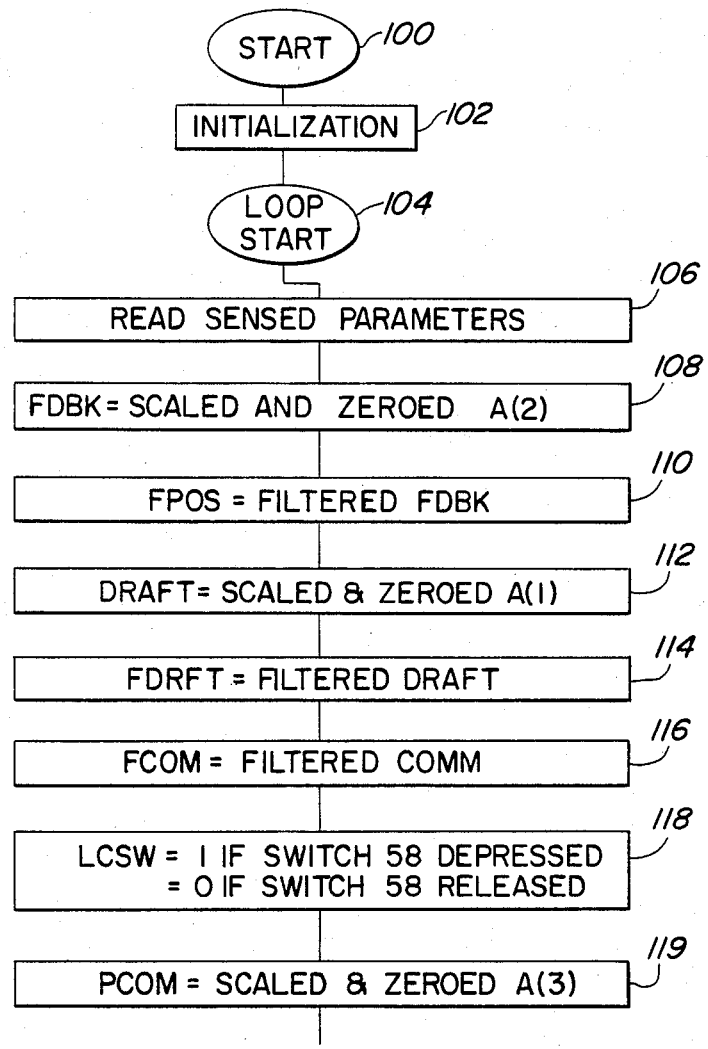
FIG. 3a–3c are flow charts of the algorithm performed by the central processing unit shown in FIG. 1.
Figure 3B:
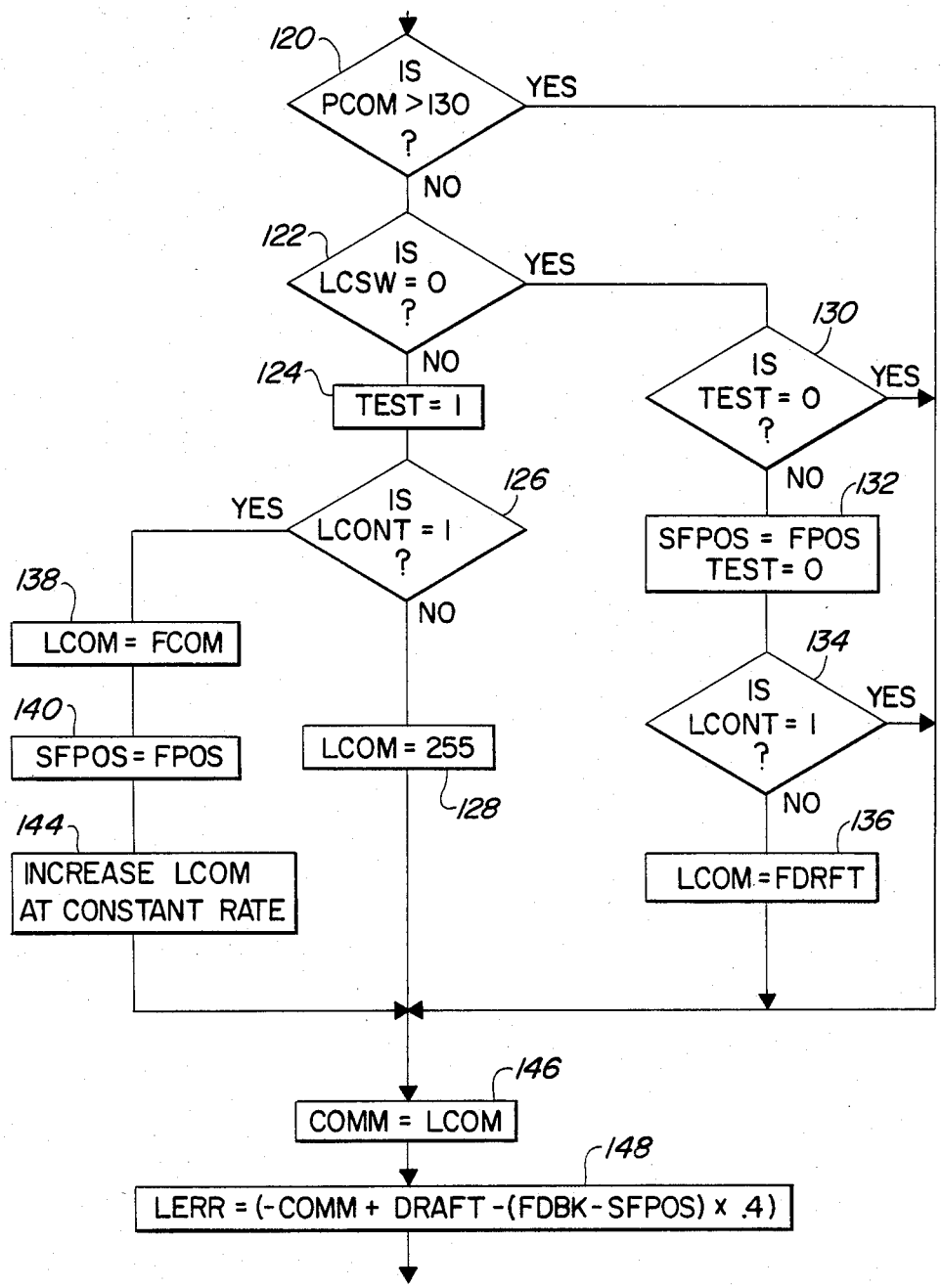
Figure 3C:
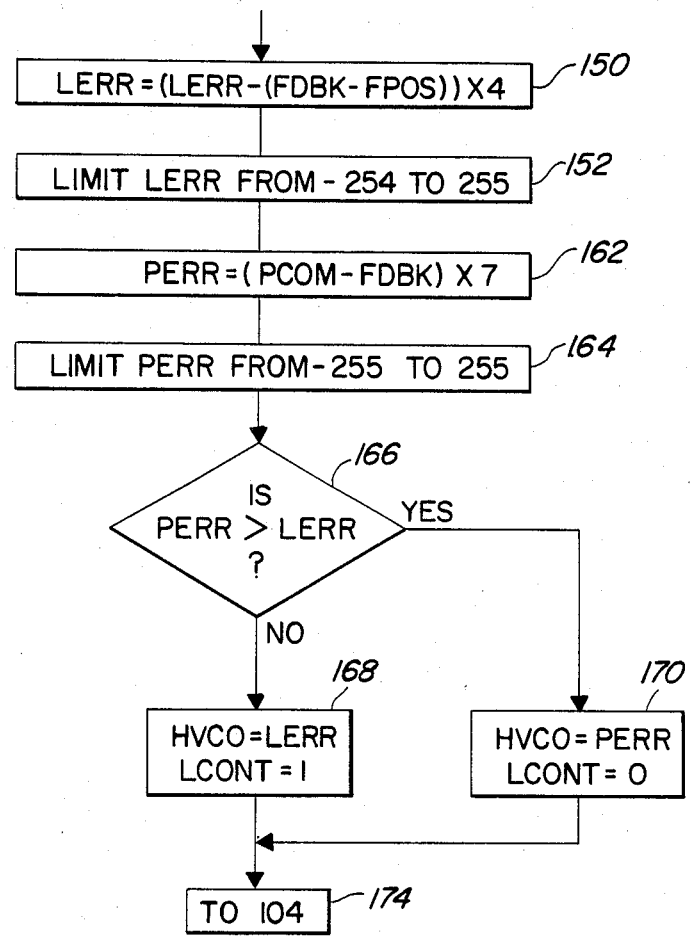

The sequence of calculations performed by the central processing unit 40 is described next, with reference to the flow charts shown in FIGS. 3a–c. The central processing unit 40 enters into its routine at a step 100, whereupon the following initial conditions are established at step 102:

COMM=255
LCOM=255
LCONT=0
PCOM=0
SFPOS=0
TEST=0

These various acronyms will be explained later in this description.

The main processing loop is entered at step 104 and is followed by step 106, wherein the values A(1) and A(2) are obtained or read from sensors 30 and 32, and values are read from the operator-controlled transducers 54, 62 and 64. It will be evident that various compensating factors can be applied to these values representing the sensed parameters to compensate for errors in calibration or adjustment of the sensors.

At step 108, the position feedback value, FDBK, is derived from the sensed position value A(2). Calibration factors are applied to the A(2) input to assure that the range of possible positions sensed by position sensor 32 will provide FDBK values with digital counts ranging from 0 to 255. The calibration factors will vary, depending upon the type of position sensor and particular linkage structure between the position sensor and the implement. Then, in step 110, a filtered position value, FPOS, is determined according to the statement FPOS=(127 × FPOS + FDBK)/128 so that the filtered position value FPOS is a weighted average of the FDBK value from step 108 and the initial FPOS value of zero or the FPOS value set at step 110 of a previous cycle of the routine. The FDBK and FPOS values are employed later in the routine to determine a normalized position feedback term which becomes part of the combined load error value, LERR, in step 148, while the FDBK value is used later to determined a position error value, PERR, in step 162.

Next, in step 112, a sensed draft force value, DRAFT, is determined by the statement DRAFT=(DRAFT+A(1))/2, so that the DRAFT value set in step 112 is an evenly weighted average of the input A(1) from draft sensor 30 and the DRAFT value which is initially zero or is set in step 112 of a previous cycle of the routine. Next, in step 114, a filtered draft value, FDRFT, is determined by the statement FDRFT=(127×FDRFT+DRAFT)/128 so that the FDRFT value set in step 114 is a weighted average of the DRAFT value from step 112 and the initial FDRFT value of zero or the FDRFT value set at step 114 of a previous cycle of the routine. This DRAFT value is also employed later in the routine to determine the load error value, LERR.

Next, in step 116, a filtered command value, FCOM, is derived from the COMM value which is set in later step 146. Then, in step 118, the status of switch 60 is examined, and a load command switch value, LCSW, is set equal to 1 if button 58 is depressed, and the LCSW value is set equal to 0 if button 58 is released. In step 119, the position command value, PCOM, is derived from the value A(3) from transducer 54 to represent a desired position of the implement.

Next, step 120 directs the flow of the algorithm to step 146 if the position command value, PCOM, is greater than a digital count of 130. Otherwise, step 120 directs the algorithm flow to step 122 where the LCSW value is examined. Step 112 directs to algorithm flow to step 130 if LCSW=0, as when button 58 is not depressed, else the routine proceeds to step 124 where a TEST value is set equal to a one or "on" value.

After step 124, step 126 directs the algorithm flow to step 138 if the LCONT value, determined in later steps 168 to 172, is equal to 1. Otherwise, step 126 directs the algorithm flow to step 128 where the draft force set point value, LCOM, is set equal to 255. This forces the LERR value to a large negative value and assures that the LERR value from steps 148 and 150 will not interfere with the PERR value when the control system is operating in its position control mode due to the operation of later described steps 166–170. Thus, the operator can raise and lower the implement under position control without interference from the load error value. After step 128, the routine proceeds to step 146.

On the other hand, if the button 58 is depressed and the control system is in its draft force responsive control mode, then step 126 will direct the algorithm flow to step 138 where the LCOM value is set equal to the FCOM value determined in previous step 116. Then, in step 140, the stored filtered position feedback value, SFPOS, is assigned the value of the filtered position feedback value, FPOS, as determined in previous step 110. Following step 140, the LCOM value is incrementally increased by a predetermined increment, in a portion of the routine presented by 144. Thus, if the button 58 is held depressed for a period of time, the LCOM value will be gradually increased by the repeated operation of 144. In this manner, the operator can hold the button 58 depressed until the desired draft set point value of LCOM is achieved.

If, in step 122, the button 58 was released, then the value of TEST is examined in step 130 to determine if the button 58 had been depressed during the previous cycle of the routine. If the button 58 had been released during the previous cycle, then TEST will equal zero due to a prior operation of step 132 and step 130 will direct the algorithm flow to step 146 and the draft force set point value LCOM will remain what it was set at in step 138 when the button 58 was depressed. However, if the button 58 had been depressed during the previous cycle, then step 130 directs the algorithm flow to step 132 where the SFPOS value is assigned the value of FPOS from step 110 and where TEST is set equal to 0 so that step 130 will prevent a return to step 132 on the next cycle of the routine. In this manner, the SFPOS value is redetermined only once each time the button 58 is released after being depressed. Next, step 134 directs the algorithm flow to step 146 if the control system is in the draft force responsive control mode so that the draft force set point LCOM will remain at the value established in step 138 when button 58 was depressed. However, if the control system is in the position responsive control mode, the step 134 directs the algorithm flow to step 136 where LCOM is set equal to the filtered draft value, FDRFT, from step 114.

In step 146, the interim command value, COMM, is set equal to the LCOM value, as determined in steps 128, 136, or 138 and 144. For hitch control systems having additional input, such as wheel slip and/or engine speed, the additional error factors relating to wheel slip and engine speed could be added to the LCOM value in step 146. Then, in step 148, the load error value, LERR, is calculated using a multiplier or sensitivity factory of, for example, (0.4). Preferably, this sensitivity factor would be varied according to soil conditions in order to achieve the best draft response, such as to stabilize hitch movement in hard ground or to allow the tractor to pitch freely without changing implement depth. An additional control potentiometer (not shown) could be provided for this purpose. Then, in step 150, the LERR value is recalculated. This LERR value is then limited to steps 152 between minimum and maximum values. Then, in step 162, the position error value, PERR, is derived from the values PCOM and FDBK, and is limited in step 164.

Next, in step 166, the PERR and LERR values are compared. If the PERR value is larger then the LERR value, then the valve command value, HVCO, is set equal to the PERR value in step 170. On the other hand, if the LERR value is greater than or equal to the PERR value, the HVCO is set equal to the LERR value in step 168. Thus, depending upon which of the values PERR and LERR is most positive, the control system operates to raise or lower the implement in response to one or the other of the position error signals, PERR, or the load or combined error signal, LERR. Also, in step 168, a LCONT value is set equal to 1 to indicate in earlier steps 126 and 134 that the system is in the draft force responsive control mode. Similarly, in step 170, LCONT is set equal to 0 to indicate that the system is in the position responsive control mode.

The positive or negative digital HVCO value from steps 168 or 170 is converted to a pulse width modulated signal via PIT 320, for example, and is applied to the torque motor of the control valve 34 so that an increase in the positive HVCO value will tend to raise the implement (not shown). The speed of implement movement will be proportional to the magnitude of the HVCO value. Raising the implement reduces the LERR or PERR value and reduces the HVCO value until a steady state condition is obtained wherein the HVCO value is minimized. Conversely, a negative HVCO value causes a lowering of the implement until a new steady state condition is achieved. After steps 168 or 170, the routine returns to step 104 via step 174. The entire routine may be repeated at a 100 Hz rate, although other repetition rates may also be suitable.

With the above-described system, the hitch and implement may be lowered by moving the lever 50 forward (to the left, viewing FIG. 1) with the button 58 depressed. When the proper depth and corresponding draft force is achieved, the operator then releases the button 58. The average or filtered draft force value at the instant the button 58 is released will be retained and used as the draft force operating set point during subsequent operation. With the button 58 released, the system will operate in its draft force reponsive mode and further forward movement of the lever 50 (with button 58 released) will not lower the hitch and implement further. The lever should be moved completely forward to allow the hitch to freely move as the tractor pitches over uneven ground. It can also be left at the position desired to establish a lower limit.

The hitch and implement may be raised by pulling the lever 50 back (to the right, viewing FIG. 1) past the position where the button 58 was released. This increases the position command value, PCOM, and the corresponding position error value, PERR, so that the PERR value will be larger than the LERR value. The hitch and implement will then be raised in direct proportion to the backward movement of lever 50.

If the lever 50 is in the maximum forward position, the operator may increase the implement depth and corresponding draft force by merely depressing the button 58 which increments the LCOM value in step 144.

If the operator raises the implement after a plowing operation by using the position control lever (such as at the end of a row), and then lowers it by using the position control lever, the control system will operate with the set point value which was stored during the most recent plowing operation. Thus the operator's task is simplified since he does not have to redetermine the operating set points each time the implement is raised and lowered.

The conversion of the above flow chart into a standard language for implementing the algorithm in a digital data processor, such as the microprocessor 310, will be evident to those with ordinary skill in the art.

It should also be noted that the particular numerical values given in the preceeding description are merely exemplary and could be changed for many reasons, including tailoring the system for a different implement or vehicle, without departing from the scope of the invention. It would also be within the scope of this invention to control a towed implement with drawbar draft sensing, or with a T-bar on the draft links and draft link sensing, and with an electrically-operated, 4-way, 3-position control valve for controlling fluid communication to a remote cylinder on the towed implement with a diverter valve for diverting fluid from a solenoid-operated rockshaft control valve to the remote cylinder on the towed implement. Similarly, it is within the scope of this invention to control a semi-integral implement with one or more remote cylinders in series with the rockshaft cylinder with draft sensing in the hitch draft linkages.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

What is claimed is:

1. In a vehicle having connecting means for coupling a ground-penetrating implement thereto and actuating means for raising and lowering the connecting means to vary implement ground penetration in response to signals applied to an input thereof, a control system comprising:
   a parameter sensing means for generating a parameter signal representing a sensed operating parameter of a machine system comprised of the vehicle and the implement;
   an operator-actuatable switch means;
   a signal processing unit coupled to the parameter sensor and to the switch means, the signal processing unit comprising means responsive to actuation of the switch means for storing a selected value of said parameter signal for use as a parameter set point value, means for generating a parameter error signal derived from at least a difference between the parameter signal and the parameter set point value, and
   means for converting at least the parameter error signal to a control signal and for applying the control signal to the input of the actuating means, the actuating means raising and lowering the connecting means in response to changes in the control signal and at a rate proportional to the magnitude of the control signal.

2. The control system of claim 1, wherein the parameter sensing means comprises:
   a draft sensor for generating a draft signal representing a sensed draft force produced by implement-ground interaction, and the parameter signal is comprised of the draft signal.

3. The control system of claim 1, further comprising:
   an operator-movable position control lever having an operator-graspable housing, the switch means comprising a momentary contact push-button switch mounted in the housing.

4. In a vehicle having connecting means for attaching a ground-penetrating implement thereto and actuating means for raising and lowering the connecting means to vary implement ground penetration in response to signals applied to an input thereof, a control system comprising:
   a draft sensor for generating a draft signal representing a sensed draft force produced by implement-ground interaction;
   an operator-actuatable switch means;
   a signal processing unit coupled to the draft sensor and to the switch means, the signal processing unit comprising means responsive to actuation of the switch means for storing a selected value of said draft signals for use as a draft force set point value, means for generating a load error signal derived from a least a difference between the draft signal and the draft force set point value, and
   means for converting at least the load error signal to a control signal and for applying the control signal to the input of the actuating means, the actuating means raising and lowering the implement in response to changes in the control signal and at a rate proportional to the magnitude of the control signal.

5. The control system of claim 4, wherein:
   the signal processing unit further comprises means for varying in a predetermined manner the draft force set point value in response to continuous actuation of the switch means.

6. The control system of claim 5, wherein:
   the set point value varying means increases the value of the set point at a contant rate upon continuous actuation of the switch means.

7. The control system of claim 4, further comprising:
   an operator-movable position control lever having an operator-graspable housing, the switch means comprising a momentary contact push-button switch mounted in the housing.

8. The control system of claim 4, further comprising:
   operator-controlled means for generating a position command signal representing a desired position of the implement; and
   position sensing means for generating a position signal representing an actual position of the implement, the signal processor further comprising means for generating a position error signal derived from a difference between the position command signal and the position signal, and means for selecting the one of the load and position error signals for application to the input of the actuating means.

9. The control system of claim 8, wherein the signal processor further comprises:
   means for setting the draft force set point value to a predetermined maximum value so that the implement can be rasied and lowered without interference from the load error signal.

10. In a vehicle having connecting means for attaching a ground-penetrating implement thereto and actuating means for raising and lowering the connecting means to vary implement ground penetration in response to signals applied to an input thereof, a control system comprising:
    operator-controlled means for generating a position command signal representing a desired position of the implement, the operator-controlled means including a transducer and a movable lever coupled to the transducer;
    position sensing means for generating a position signal representing an actual position of the implement;
    draft sensing means for generating a draft signal representing an actual draft force produced by implement-ground interaction;
    an operator-actuatable switch mounted on the lever;
    a signal processing unit coupled to each of the sensing means and to the switch, the signal processing unit comprising means for storing a selected value of the draft signal for use as a draft set point value;
    means for generating a load error signal derived from at least a difference between the draft signal and the draft force set point value, and
    means for converting at least the load error signal to a control signal and for applying the control signal to the input of the actuating means, the actuating means raising and lowering the implement in response to changes in the control signal and at a rate proportional to the magnitude of the control signal.

11. The control system of claim 10, wherein the signal processor further comprises:
means for varying the draft force set point value at a constant predetermined rate in response to continuous actuation of the switch.

12. The control system of claim 10, further comprising:
operator-controlled means for generating a position command signal representing a desired position of the implement; and
position sensing means for generating a position signal representing an actual position of the implement, the signal processor further comprising means for generating a position error signal derived from a difference between the position command signal and the position signal, and means for selecting the largest of the load and position error signals for application to the input of the actuating means.

13. The control system of claim 12, wherein the signal processor further comprises:
means for varying the draft force set point value at a constant predetermined rate in response to continuous actuation of the switch; and
means for setting the draft force set point value to a predetermined maximum value so that the implement can be raised and lowered without interference from the load error signal.

14. In a vehicle having connecting means for coupling a ground-penetrating implement thereto and actuating means for raising and lowering the connecting means to vary implement ground penetration in response to signals applied to an input thereof, a control system comprising:
(a) a first parameter sensor for generating a first parameter signal representing a first operating parameter of a machine system comprised of the vehicle and the implement;
(b) a second parameter sensor for generating a second parameter signal representing a second operating parameter of a machine system;
(c) an operator-actuatable switch;
(d) a signal processing unit coupled to the parameter sensors and to the switch, the signal processing unit comprising:
(1) means responsive to actuation of the switch for storing a selected value of said first parameter signal for use as a first parameter set point value;
(2) means for generating a first parameter error signal derived from the first parameter signal and from the first parameter set point value;
(3) means for generating a second parameter error signal derived from at least the second parameter signal;
(4) means for selecting one of said first and second parameter error signal depending upon a relationship therebetween; and
(5) means for modifying the first parameter set point value depending upon which of the first and second parameter error signals is selected;
(e) means for converting the selecting error signal to a control signal; and
(f) means for applying the control signal to the input of the actuating means.

* * * * *